United States Patent
Igarashi et al.

(10) Patent No.: US 8,209,813 B2
(45) Date of Patent: Jul. 3, 2012

(54) VEHICLE WINDSHIELD WIPER SYSTEM

(75) Inventors: Yuji Igarashi, Kiryu (JP); Kazuhiro Sekiguchi, Kiryu (JP); Mikito Kato, Aki (JP); Junji Kishimoto, Aki (JP)

(73) Assignee: Mitsuba Corporation, Kiryu-Shi (JP)

( * ) Notice: Subject to any disclaimer, the term of this patent is extended or adjusted under 35 U.S.C. 154(b) by 713 days.

(21) Appl. No.: 12/269,927

(22) Filed: Nov. 13, 2008

(65) Prior Publication Data
US 2009/0126141 A1 May 21, 2009

(30) Foreign Application Priority Data
Nov. 19, 2007 (JP) ................. 2007-299685

(51) Int. Cl.
*B60S 1/06* (2006.01)
*B60S 1/24* (2006.01)

(52) U.S. Cl. ............... 15/250.3; 15/250.31; 15/250.27; 296/96.17; 296/192; 296/96.21

(58) Field of Classification Search .............. 15/250.3, 15/250.31, 250.27, 250.14; 296/96.15, 96.17, 296/192, 96.21
See application file for complete search history.

(56) References Cited

U.S. PATENT DOCUMENTS

| | | | | |
|---|---|---|---|---|
| 4,988,144 A | * | 1/1991 | Johnson et al. | 296/192 |
| 5,203,602 A | * | 4/1993 | Eustache | 296/96.15 |
| 5,836,042 A | * | 11/1998 | Funk et al. | 15/250.3 |
| 7,950,717 B2 | * | 5/2011 | Metz | 296/96.15 |
| 2003/0001407 A1 | * | 1/2003 | Hoshikawa et al. | 296/96.15 |

FOREIGN PATENT DOCUMENTS

| | | | |
|---|---|---|---|
| DE | 3116821 | * | 11/1982 |
| GB | 2219932 | * | 12/1989 |
| JP | 2006315511 | | 11/2006 |

OTHER PUBLICATIONS

Machine translation of description portion of German patent publication 3116821, published Nov. 1982.*

* cited by examiner

*Primary Examiner* — Gary Graham
(74) *Attorney, Agent, or Firm* — Marshall & Melhorn, LLC

(57) ABSTRACT

In a vehicle windshield wiper system, a support base includes a connecting rod (9) fixedly attached to a vehicle body and extending across a width of the vehicle body, and a base member (10, 11) depending from an intermediate part of the connecting member. A wiper motor (2) attached to a lower surface of a horizontal wall portion (11) of the base member, and a crank arm (3) is attached to an output shaft of the wiper motor. The base member is formed with an opening (13) to avoid an interference with the crank arm as the crank arm undergoes the rotative movement. The opening in the support base prevents an interference with the movement of the crank arm, and this allows the crank arm and an associated link mechanism (6) to be placed opposite to a vertically intermediate part of the support base, and immediately adjacent to the support base. Therefore, the windshield wiper system can be accommodated in a readily available space (24) under the lower edge of the windshield.

7 Claims, 4 Drawing Sheets

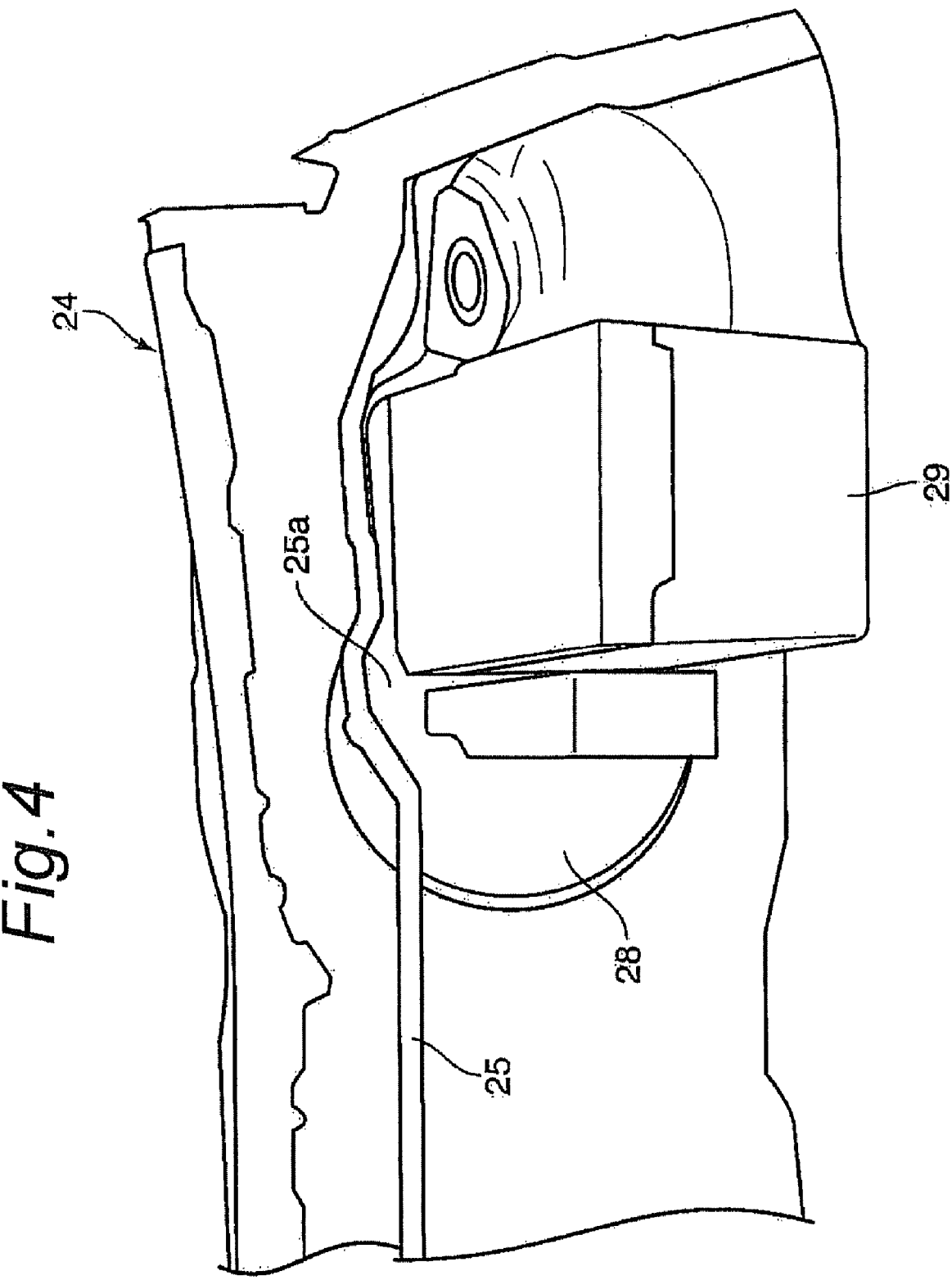

VEHICLE WINDSHIELD WIPER SYSTEM

TECHNICAL FIELD

The present invention relates to a vehicle windshield wiper system comprising a wiper motor, a crank arm actuated by the wiper motor and a link mechanism for transmitting the actuating force applied to the crank arm to a left and right pivot assembly that support corresponding wiper arms.

BACKGROUND OF THE INVENTION

Japanese patent laid open publication (kokai) No. 2006-315511 discloses a vehicle windshield wiper system comprising a wiper motor, a crank arm actuated by the wiper motor and a link mechanism for transmitting the actuating force applied to the crank arm to a left and right pivot assembly that support corresponding wiper arms 7 and 8. The entire wiper system is received in a recess defined under and along the lower edge of the windshield, and the wiper motor is placed under a plate member to keep off water from the wiper motor so that the rusting and corrosion of the wiper motor and pivot shafts may be avoided.

In this previously proposed windshield wiper system, a laterally elongated and curved frame member supports a pivot assembly at each end, and a link arm is attached to a lower end of a pivot shaft supported by each pivot assembly. The crank arm and link mechanism for transmitting the actuating force to these link arms are provided in a lower part of the wiper system. Because the crank arm and link mechanism undergo relatively large displacements in operation, a relatively large space is required in a lower part of the recess, and this creates a significant problem in the design of the vehicle body.

BRIEF SUMMARY OF THE INVENTION

In view of such problems of the prior art, a primary object of the present invention is to provide a vehicle windshield wiper system which is highly compact.

A second object of the present invention is to provide a vehicle windshield wiper system which is configured to be installed in a space available immediately under and along a lower edge of a windshield.

According to the present invention, such an object can be accomplished at least partly by providing a vehicle windshield wiper system, comprising: a support base including a connecting member fixedly attached to a vehicle body and extending across a width of the vehicle body, and a base member depending from an intermediate part of the connecting member; a wiper motor attached to the base member; a crank arm attached to an output shaft of the wiper motor; a pair of pivot assemblies mounted on either end portion of the connecting member and rotatably supporting corresponding pivot shafts connected to base ends of wiper arms; a link mechanism for transmitting a rotative movement of the crank arm to the pivot shafts; wherein the base member is formed with an opening to avoid an interference with the crank arm as the crank arm undergoes the rotative movement.

The opening in the support base prevents an interference with the movement of the crank arm, and this allows the crank arm and link mechanism to be placed opposite to a vertically intermediate part of the support base, and immediately adjacent to the support base. Therefore, the windshield wiper system can be accommodated in a readily available space under the lower edge of the windshield.

In particular, the base member may include a front wall portion and a horizontal wall portion extending rearward from a lower end of the front wall portion so that the wiper motor may be attached to a lower surface of the horizontal wall portion, the opening being formed in the front wall portion. In such a case, the wiper motor may have an output shaft extending substantially vertically and passed through the horizontal wall portion. Typically, the wiper motor has a substantially horizontal axial line, but may also have a vertical axial line if desired.

According to a preferred embodiment of the present invention, the wiper motor is confined within a lateral space defined between center lines of the pivot shafts. Thereby, the lateral width of the wiper system can be minimized, and this contributes to a compact design of the wiper system.

If the link mechanism comprises at least a pair of link rods for transmitting a rotative movement of the crank arm to the pivot shafts, and the link rods and connecting member extending across a width of the vehicle body, the fore-and-aft dimension of the wiper system can be minimized.

According to a particularly preferred embodiment of the present invention, a recess is defined in the vehicle body along a lower edge of a windshield, and the connecting member extends in an upper forwardly part of the recess while the wiper motor is disposed in a lower rearwardly part of the recess. Thereby, the available space under the lower edge of the windshield can be efficiently utilized so as to accommodate the wiper system with a minimum impact on the vehicle body design. In particular, such an arrangement minimizes the protrusion of the recess into the engine room. To such an end, it is preferable if the front wall portion of the support base extends vertically in the recess with a small forward slant.

BRIEF DESCRIPTION OF THE DRAWINGS

Now the present invention is described in the following with reference to the appended drawings, in which:

FIG. 4 is a perspective view of an engine room which is separated from the recess by a cowl front panel.

DETAILED DESCRIPTION OF THE PREFERRED EMBODIMENTS

Figure 1:
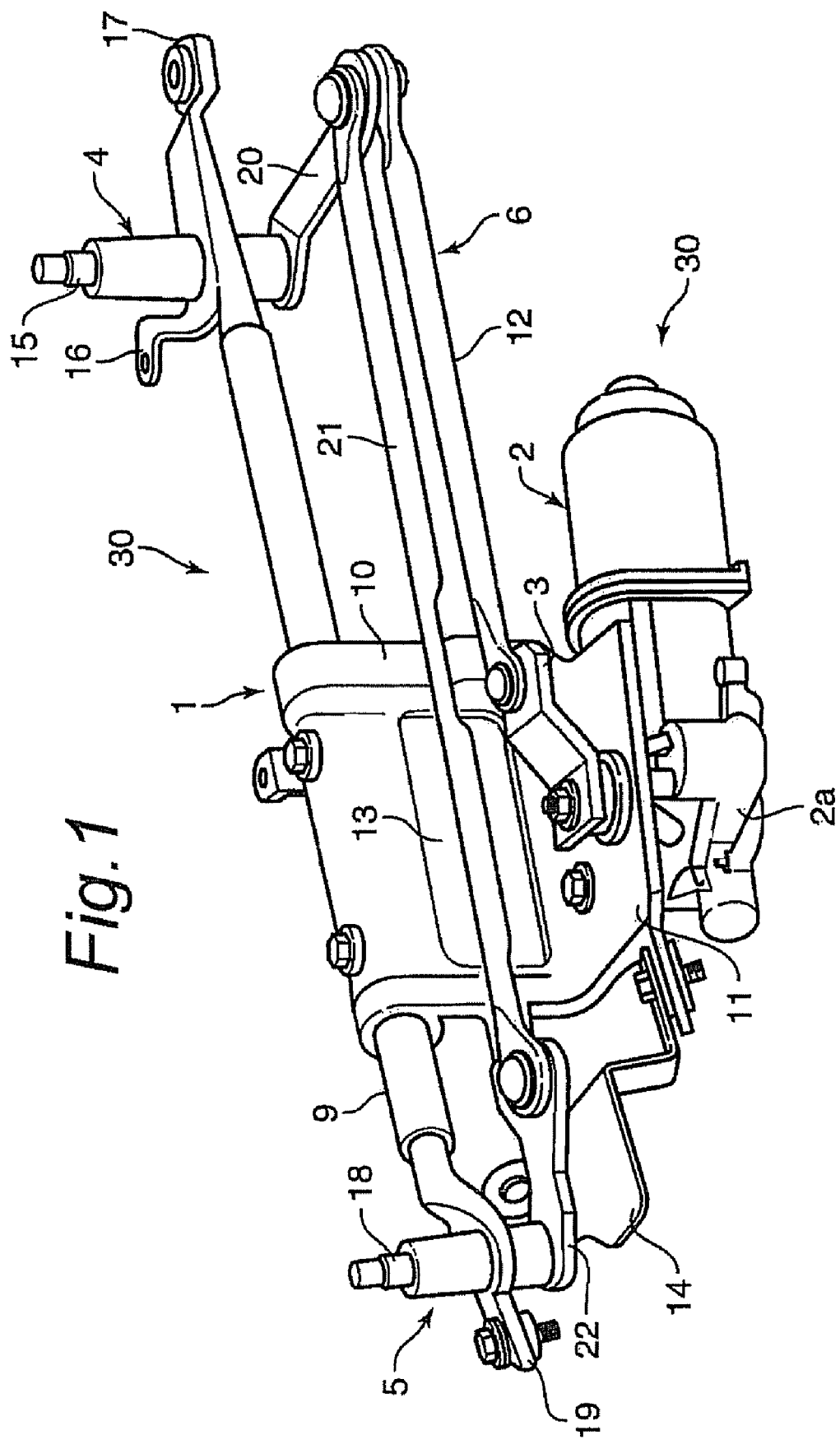
FIG. 1 is a perspective rear view showing a vehicle windshield wiper system embodying the present invention.
Figure 2:
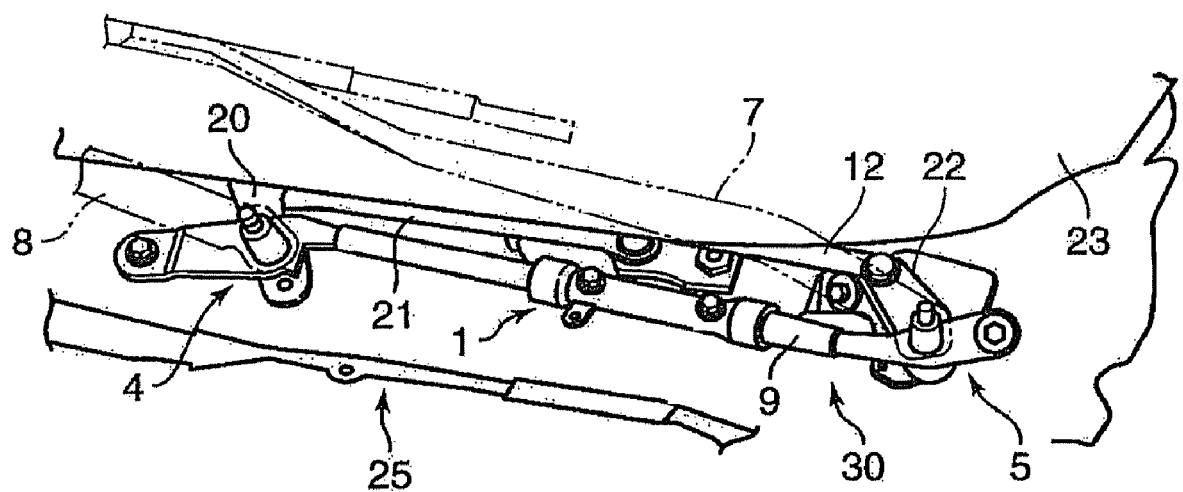
FIG. 2 is a fragmentary perspective front view showing how the wiper system in placed in a recess defined under and along a lower edge of a windshield.
Figure 3:
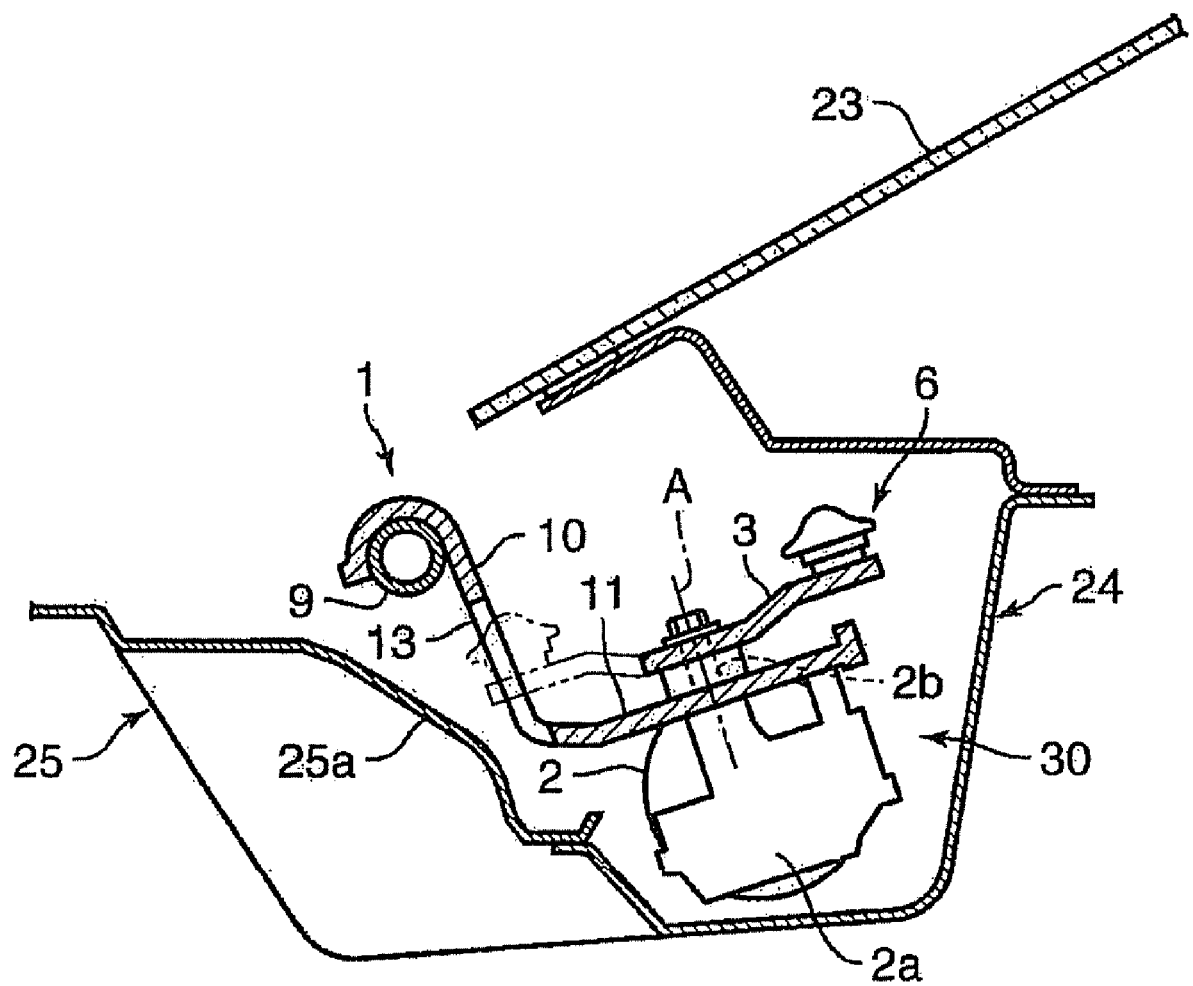
FIG. 3 is a sectional view showing the wiper system mounted in the recess.

FIGS. 1 and 3 show a vehicle windshield wiper system embodying the present invention. This wiper system comprises a wiper motor (electric motor) 2 mounted on a support base 1, a crank arm 3 actuated by this wiper motor 2, a link mechanism 6 that transmits the actuating force of the crank arm 3 to a pair of pivot units 4 and 5 mounted on the support base 1 and a pair of wiper arms 7 and 8 having base ends thereof pivotally supported by the corresponding pivot units 4 and 5.

The support base 1 comprises a connecting rod 9 that extends laterally across the width of the vehicle body, and have two lateral ends that are fixedly attached to a vehicle body as will be described hereinafter. The two pivot units 4 and 5 are fixedly mounted on corresponding lateral end portions of the connecting rod 9. The connecting rod 9 may also consist of any member other than a rod that is laterally elongated, and provided with a required mechanical strength.

The support base 1 further comprises a base member including a front wall portion 10 depending from an intermediate part of the connecting rod 9 and a horizontal wall portion 11 bent perpendicularly rearward from the lower end of the front wall portion 10. The front wall portion 10 has a major surface that extends generally perpendicularly to the fore-and-aft direction of the vehicle body, and the horizontal wall portion 11 is bent from the front wall at a lower edge thereof extending substantially in parallel with the connecting rod 9. The wiper motor 2 is attached to the lower surface of the horizontal wall portion 11 with a central axial line extending substantially in parallel with the connecting rod 9.

The wiper motor 2 is incorporated with a reduction gear unit 2a that reduces the rotational speed of the electric motor, and has an output shaft 2b extending upwards and passed through the horizontal wall portion 11. To an upper end of the output shaft 2b is attached a base end of the crank arm 3. To a free end of the crank arm 3 is attached a base end of a first link rod 12.

The front wall portion 10 is formed with a rectangular opening 13 in a lower part thereof so that the movements of the free end of the crank arm 3 and the base end of the first link rod 12 connected thereto may not be interfered by the front wall portion 10. Numeral 14 denotes a bracket 14 for supporting the horizontal wall portion 11 to the vehicle body.

The pivot unit 4 on the right hand side of the vehicle body rotatably supports a first pivot shaft 15 serving as a drive shaft of one of the wiper arms 8. The part of the connecting rod 9 supporting the right pivot unit 4 is additionally incorporated with mounting brackets 16 and 17 for mounting the right end of the connecting rod 9 to the vehicle body. The pivot unit 5 on the left hand side of the vehicle body rotatably supports a second pivot shaft 18 serving as a drive shaft of the other wiper arm 7. The part of the connecting rod 9 supporting the left pivot unit 5 is additionally incorporated with a mounting bracket 19 for mounting the left end of the connecting rod 9 to the vehicle body.

To the lower end of the first pivot shaft 15 is attached a base end of a first drive arm 20. A free end of the first drive arm 20 is pivotally connected to a free end of the first link rod 12 and a base end of the second link rod 21 at upper and lower sides of the first drive arm 20, respectively. To the lower end of the second pivot shaft 18 is connected a base end of a second drive arm 22. A free end of the second drive arm 22 is connected to a free end of the second link rod 21. The first and second link rods 12 and 21, and the first and second drive arms 20 and 22 form the link mechanism 6 that transmits the actuating force applied to the crank arm 3 by the wiper motor 2 to the left and right pivot assemblies 4 and 5 to rotatively actuate the first and second pivot shafts 15 and 18 supported by the left and right pivot assemblies 4 and 5, respectively.

More specifically, when the wiper motor 2 is actuated, the resulting rotation of the output shaft 2b of the reduction gear unit 2a causes the crank arm 3 to turn around the axial center of the output shaft 2b. This rotation is transmitted to the first drive arm 20 via the first link rod 12, and causes the first drive arm 20 to turn around the axial center of the first pivot shaft 15. The rotation of the first drive arm 20 is then transmitted to the second drive arm 22 via the second link rod 21, and causes the second drive arm 22 to turn around the axial center of the second pivot shaft 18. The rotative movements of the first and second drive arms 20 and 22 causes the swinging movements of the wiper arms 7 and 8 having the base ends fixedly attached to the first and second pivot shafts 15 and 18, respectively, so that a prescribed area of a windshield 23 may be wiped.

As shown in FIG. 3, the support base 1, wiper motor 2, crank arm 3 and link mechanism 6 form a modular wiper unit assembly 30 that can be handled as a single, integrated assembly, and is installed within a recess 24 extending laterally along the lower edge of the windshield 23. The mounting bracket 14 for the base member (10 and 11) and the mounting brackets 16, 17 and 19 for the pivot assemblies 4 and 5 are fixedly attached to appropriate parts of the vehicle body in such a manner that the connecting rod 9 of the support base 1 extends laterally in an upper front part of the laterally elongated recess 24 and the wiper motor 2 is located in a lower rear part of the recess 24. The wiper motor 2 and link rods 12 and 21 of the link mechanism 6 also extend laterally with respect to the vehicle body.

The front side of the recess 24 is defined by a cowl front panel 25 that extends obliquely from the upper surface of the front part of the vehicle body to the bottom of the recess 24, defining an obtuse angle with respect to the upper surface of the front part of the vehicle body. Therefore, the recess 24 is narrower in a bottom part thereof than in an upper part thereof. The cowl front panel 25 includes a bulge 25a that bulges into the recess 24 to avoid interference with a brake booster 28 and/or a battery 29 that are mounted in the engine room defined on the other side of the cowl front panel 25. As shown in FIG. 3, as the axial center line A of the output shaft 2b of the reduction gear unit 3a slightly tilts forward within the recess 24, and the front wall portion 10 of the support base 1 extends along the opposing surface of the bulge 25a.

Thus, in a vehicle windshield wiper system comprising a wiper motor 2, a crank arm 3 actuated by the wiper motor 2 and a link mechanism 6 for transmitting the actuating force applied to the crank arm 3 to a left and right pivot assembly 4 and 5 that support corresponding wiper arms 7 and 8, a support base 1 that includes a connecting member 9 that connects the two pivot assemblies 4 and 5 to each other and a base member (10 and 11) rotatively supporting the crank arm 3 is disposed between the two pivot assemblies 4 and 5, and an opening 13 is formed in the support base 1 so as to avoid an interference with a movement of the crank arm 3. Thereby, the vehicle windshield wiper system can be constructed as a highly compact assembly without complicating the overall structure.

More specifically, because of the provision of the opening 13 in the base member for avoiding the interference with the crank arm 3, the crank arm 3 and link mechanism 6 can be placed adjacent to a vertically intermediate part of the support base 1, and the output shaft 2b of the reduction gear unit 2a supporting the crank arm 3 can be provided in a relatively forward position adjacent to the front wall portion 10 of the support base 1 without causing the front wall portion 10 to interfere with the movement of the crank arm 3 (see the imaginary lines in FIG. 3). Therefore, the crank arm 3 can be placed immediately next to the front wall portion 10 of the base member, and the for-and-aft dimension of the vehicle windshield wiper system can be minimized.

Because the crank arm 3 and link mechanism 6 are disposed opposite to a vertically intermediate part of the support base 1, the recess for receiving the wiper system is not required to be significantly wide in the bottom part thereof as opposed to the prior proposal in which the crank arm 3 and link mechanism 6 are disposed in a lower part of the wiper system and hence in a bottom part of the recess. Therefore, according to the present invention, the recess may have a relatively small width particularly in the bottom region thereof so that the space of the engine room can be maximized.

Because the wiper motor 2 is provided between the two pivot assemblies 4 and 5 without laterally outwardly protruding from them, the lateral width of the wiper system can be minimized, and this also contributes to a compact arrangement of the wiper system.

As the connecting rod 9 and link rods 12 and 21 of the link mechanism 6 extend laterally across the width of the vehicle body, the fore-and-aft dimension of the wiper system can be minimized, and this allows the wiper system to be installed in a relatively narrow recess defined under the lower edge of the windshield. This also contributes to a compact arrangement of the wiper system.

Because the wiper system extends obliquely as seen from side, and the wiper motor extends obliquely rearward toward or under the lower edge of the windshield, the recess for receiving the wiper system can be formed in a convenient space without impacting the arrangement of the vehicle body. Also, according to this arrangement, the pivot assemblies 4 and 5 can be placed immediately adjacent to the lower edge of the windshield, and this is beneficial in minimizing the necessary length of each wiper arm. In such a case, it is advantageous in terms of space requirements if the front wall portion of the support base extends vertically in the recess with a small rearward slant.

Although the present invention has been described in terms of a preferred embodiment thereof, it is obvious to a person skilled in the art that various alterations and modifications are possible without departing from the scope of the present invention which is set forth in the appended claims. For instance, the axial line of the wiper motor 2 was substantially horizontal in the illustrated embodiment, but may also have a substantially vertically oriented axial line and extend substantially, along with the output shaft thereof, in parallel with the front wall portion.

The contents of the original Japanese patent application on which the Paris Convention priority claim is made for the present application are incorporated in this application by reference.

The invention claimed is:

1. A vehicle windshield wiper system, comprising:
    a support base including a connecting member fixedly attached to a vehicle body, and extending across a width of the vehicle body, and a base member depending from an intermediate part of the connecting member;
    a wiper motor attached to the base member;
    a crank arm attached to an output shaft of the wiper motor the output shaft defining an axial center line;
    a pair of pivot assemblies mounted on either end portion of the connecting member and rotatably supporting corresponding pivot shafts connected to base ends of wiper arms;
    a link mechanism for transmitting a rotative movement of the crank arm to the pivot shafts;
    wherein the base member includes a front wall portion having an upper end connected to the connecting member and a horizontal wall portion extending rearward from a lower end of the front wall portion, and the wiper motor is attached to a lower surface of the horizontal wall portion, the front wall portion being formed with an opening thereof so as to avoid the front wall from interfering with the rotative movement of the crank arm; and
    wherein the support base and the wiper motor are received in a laterally extending recess defined under a lower edge of a window shield such that the axial center line intersects the window shield.

2. The vehicle windshield wiper system according to claim 1, wherein the wiper motor has an output shaft extending substantially vertically and passed through the horizontal wall portion.

3. The vehicle windshield wiper system according to claim 2, wherein the wiper motor has a substantially horizontal axial line.

4. The vehicle windshield wiper system according to claim 1, wherein the wiper motor is confined within a lateral space defined between center lines of the pivot shafts.

5. The vehicle windshield wiper system according to claim 1, wherein the link mechanism comprises at least a pair of link rods for transmitting a rotative movement of the crank arm to the pivot shafts, and the link rods and connecting member extending across a width of the vehicle body.

6. The vehicle windshield wiper system according to claim 1, further comprising a recess defined in the vehicle body along a lower edge of a windshield, wherein the connecting member extends in an upper forwardly part of the recess while the wiper motor is disposed in a lower rearwardly part of the recess.

7. The vehicle windshield wiper system according to claim 6, wherein the front wall portion of the support base extends vertically in the recess with a small forward slant.

* * * * *